UNITED STATES PATENT OFFICE.

PAUL EHRLICH AND ALFRED BERTHEIM, OF FRANKFORT-ON-THE-MAIN, GERMANY, ASSIGNORS TO FARBWERKE VORM. MEISTER, LUCIUS & BRÜNING, OF HÖCHST-ON-THE-MAIN, GERMANY, A CORPORATION OF GERMANY.

ALKALI COMPOUNDS OF DIOXYDIAMINOARSENOBENZENE.

1,059,983. Specification of Letters Patent.   Patented Apr. 29, 1913.
No Drawing. Application filed July 24, 1912.   Serial No. 711,283.

*To all whom it may concern:*

Be it known that we, PAUL EHRLICH, M. D., professor of medicine, and ALFRED BERTHEIM, Ph. D., chemist, citizens of the Empire of Germany, residing at Frankfort-on-the-Main, Germany, have invented certain new and useful Improvements in Alkali Compounds of Dioxydiaminoarsenobenzene, of which the following is a specification.

We have found that compounds of the dioxydiaminoarsenobenzene of great therapeutical value can be produced by transforming it into the alkalidiphenolate. Thus greenish-yellow powdered compounds are formed, which are readily soluble in water and have the formula:

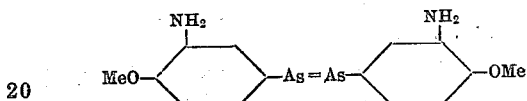

wherein "Me" stands for an alkali metal. By the fact that these new compounds are soluble in water they are distinguished from the dioxydiaminoarsenobenzene, which is insoluble in water, whereas they differ from the dichlorhydrate of the latter compound, which when dissolved in water shows an acid reaction, by the alkaline reaction of their solution. There are also differences between the various compounds as regards their points of fusion and decomposition respectively, although these points are not sharply defined.

It is advantageous to produce the new compounds by treating the alcoholic suspension of the base with alcoholates or with solutions of alkali-hydroxids or alkali-carbonates.

The following examples serve to illustrate our invention.

Example I: 73 grams of dioxydiaminoarsenobenzene are suspended in 700 ccm. of methyl alcohol and there are then added, without access of air, 190 grams of a 5% solution of sodium methylate. The mixture is stirred until it is dissolved, then filtered in hydrogen or nitrogen atmosphere in order to avoid oxidation, whereupon the solution is run, without access of oxygen, into a mixture of 1 liter of absolute alcohol and 4 liters of ether, while quickly stirring. The precipitate thus obtained is filtered without access of air, washed with a mixture of equal parts of alcohol and ether and dried in a vacuum without access of air. Thus a powder of a yellow color with a green hue is obtained, which is readily soluble in water and, when exposed for a longer time to the air, loses its original solubility whereby it is distinguished, apart from the alkaline reaction it shows, from the dichlorhydrate of the dioxydiaminoarsenobenzene. Its formula is:

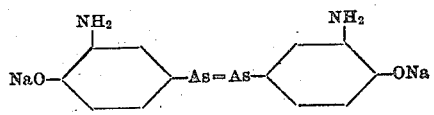

Example II: 36.6 grams of dioxydiaminoarsenobenzene are suspended in 120 grams of methyl alcohol and there are then added 11.2 grams of potassium hydroxid dissolved in 150 ccm. of methyl alcohol. The resulting clear solution is run at + 5° C. into a mixture of 1 liter of alcohol and 3 liters of ether, whereupon the potassium salt separates in the form of a greenish-yellow powder readily soluble in water. In preparing this compound, it is also necessary to prevent the access of oxygen, and the procedure for drying it is the same as that indicated in Example I.

Having now described our invention, what we claim is:

1. As new products, the alkali-diphenolates of the dioxydiaminoarsenobenzene, having the constitutional formula:

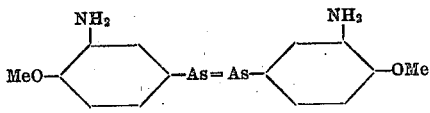

wherein "Me" stands for an alkali metal, being light-colored powders, readily soluble in water with alkaline reaction.

2. As a new product, the sodium-phenolate of the dioxydiaminoarsenobenzene, having the constitutional formula:

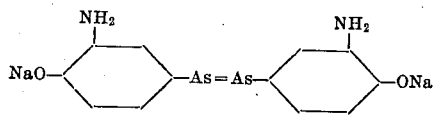

being a light colored powder, readily soluble in water with alkaline reaction.

In testimony whereof, we affix our signatures in presence of two witnesses.

PAUL EHRLICH.
ALFRED BERTHEIM.

Witnesses:
 ELSE MEBUS,
 CARL GRUND.